(12) United States Patent  
Ichikawa

(10) Patent No.: US 6,979,091 B2  
(45) Date of Patent: Dec. 27, 2005

(54) DOOR MIRROR SET PLATE

(75) Inventor: Osamu Ichikawa, Oota (JP)

(73) Assignee: Mitsuba Corporation, Gunma (JP)

( * ) Notice: Subject to any disclaimer, the term of this patent is extended or adjusted under 35 U.S.C. 154(b) by 83 days.

(21) Appl. No.: 10/601,660

(22) Filed: Jun. 24, 2003

(65) Prior Publication Data

US 2005/0073758 A1  Apr. 7, 2005

(30) Foreign Application Priority Data

Jun. 25, 2002   (JP) .............................. 2002-184015

(51) Int. Cl.[7] ............................................ G02B 7/182
(52) U.S. Cl. ..................... 359/872; 359/841; 248/479
(58) Field of Search .............................. 359/841, 872, 359/877; 248/476, 479, 549, 900

(56) References Cited

U.S. PATENT DOCUMENTS 5,731,375 A * 3/1998 Park et al. .................. 524/405
6,130,514 A * 10/2000 Oesterholt et al. .......... 318/438

* cited by examiner

Primary Examiner—Mark A. Robinson  
Assistant Examiner—Alessandro Amari  
(74) Attorney, Agent, or Firm—Wenderoth, Lind & Ponack, L.L.P.

(57) ABSTRACT

A door mirror set plate is formed of synthetic resin. On a base plate, a support shaft is vertically provided to rotatively support a door mirror body. A curved surface section is embedded at an outside periphery of a base of the support shaft. A flat section is formed to support a thrust washer so as to cross the curved surface section. Inside the support shaft, there is formed a wiring hole provided with a large diameter section, a small diameter section, and a step section. When a conducting wire is inserted into the wiring hole, the tip of a covering touches the step section for positioning. A stopper and a positioning protrusion are integrally formed on a base plate top surface. The stopper restricts rotational angles of the door mirror body. The positioning protrusion holds the door mirror body at a neutral position.

2 Claims, 6 Drawing Sheets

DOOR MIRROR SET PLATE

BACKGROUND OF THE INVENTION

1. Field of the Invention

The present invention relates to a car door mirror and more particularly to a set plate for rotatably supporting a door mirror body that stores a mirror plate.

2. Related Art Statement

In accordance with recent demands for weight saving of a car body and cost saving, various metal parts have been replaced by synthetic resins. A door mirror is not an exception. Synthetic resins are extensively used for not only the door mirror body, but also a set plate that supports the door mirror body. The set plate comprises a base plate to be attached to a car door and a support shaft for rotatably supporting the door mirror body. The set plate is conventionally made of zinc die cast metal. If the base plate and the support shaft are integrally molded out of synthetic resin, this would enable a drastic reduction in weight compared to a metal set plate.

With regard to using a synthetic resin for the set plate as a supporting member for the door mirror body, there have been the following problems. Firstly, if the support shaft as well as the set plate is made of synthetic resin, the base of the support shaft produces insufficient strength. While the stress concentrates on the base of the support shaft, the synthetic resin lacks the member strength against the stress concentration. In order to relieve the stress concentration, a curved surface section is generally provided at the bottom of the support shaft. However, increasing the diameter of the support shaft is undesirable because of limitations on the set plate size and relation with the other parts. For this reason, it has been difficult to form the curved surface section for relieving the stress at the support shaft base and has caused insufficient strength to the support shaft.

Secondly, a thrust washer attached to the support shaft base causes the following problem. The support shaft base is attached with the thrust washer that is arranged between the base plate and the door mirror body for supporting the door mirror body. If the support shaft base is provided with the curved surface section, however, the thrust washer cannot be placed on a flat surface, preventing smooth rotations of the door mirror body. If the thrust washer is arranged so as to avoid the curved surface section, a large play is caused between the washer and the support shaft. The washer may deviate and cover the curved surface section. Further, the washer diameter increases for the play, disadvantageous to space saving considerations.

Thirdly, there is also the problem of insufficient strength concerning a mechanism to restrict operations of the door mirror body. The set plate also provides such functions as restricting a rotational range of the door mirror body and setting a retracted position and a neutral position (working position). A conventional set plate realizes the former function by engaging a groove provided on the door mirror body with a stopper protrusion formed on the set plate and allowing rotative movement of the door mirror body for an angle to form the groove. The latter function is realized by providing a steel ball on the door mirror body and engaging it with a cavity formed at a specified location on the set plate.

The set plate, if made of synthetic resin, causes insufficient strength to the stopper protrusion that touches the groove end and restricts rotative movement of the door mirror body. The stopper protrusion and the steel ball are configured completely different although they are both associated with rotational angles of the door mirror body. There has also been a problem of complicating parts shapes and degrading the space saving efficiency.

The conventional set plate also has a problem with positioning of a conducting wire to be inserted into the support shaft. The support shaft for the set plate has a hollow inside into which the conducting wire is inserted to supply power to a motor and the like for the door mirror body. Since the conventional set plate uses a same hollow inside the support shaft, however, it is difficult to determine how long the conducting wire is inserted. In this case, a worker determines the amount of insertion by his or her visual inspection and experience. The accuracy easily fluctuates depending on workers.

SUMMARY OF THE INVENTION

It is therefore an object of the present invention to provide a door mirror set plate which solves the above-mentioned problems and excels in strength and functionality.

A door mirror set plate according to the present invention comprises: a synthetic resin base plate attached to a vehicle; a cylindrical support shaft which is vertically provided on the base plate integrally therewith and rotatively supports a door mirror body storing a mirror plate; and a curved surface section which is embedded around the support shaft base on the base plate and curvedly connects between an external surface of the support shaft and a top surface of the base plate below the top surface thereof.

Since the door mirror set plate according to the present invention provides the curved surface section at the bottom of the support shaft, it is possible to relieve stress concentration on a junction between the support shaft and the base plate and improve the durability. Since the curved surface section is provided below the top surface of the base plate, it is also possible to prevent the curved surface section from appearing above the top surface of the base plate. The curved surface section can be provided in a narrow space without increasing an external diameter of the support shaft.

On the door mirror set plate, it may be preferable to provide a flat section which is formed at an outside periphery of the support shaft base on the top surface of the base plate at the same level as the top surface of the base plate and which connects between the external surface of the support shaft and the top surface of the base plate by crossing the curved surface section. This makes it possible to use the flat section to support the bottom surface of the thrust washer provided on the support shaft base. Accordingly, the thrust washer can be supported at its internal diameter side without being disposed in the curved surface section, ensuring smooth rotation of the door mirror body.

Another door mirror set plate according to the present invention comprises: a synthetic resin base plate attached to a vehicle; a cylindrical support shaft which is vertically provided on the base plate integrally therewith and rotatively supports a door mirror body storing a mirror plate; a wiring hole which is formed inside the support shaft for inserting a conducting wire comprising a metal core wire section clad with a synthetic resin covering; a large diameter section which is provided for the wiring hole at a support shaft base side and is formed to have a diameter larger than the covering of the conducting wire; a small diameter section which is provided for the wiring hole at the tip side of the support shaft continuously with the large diameter section and is formed to have a diameter smaller than an external diameter of the covering and larger than an external diameter of the core wire section of the conducting wire; and a step section formed at a boundary between the large diameter section and the small diameter section.

When the conducting wire is inserted into the wiring hole for the door mirror set plate, the tip of the covering touches the step section. The step section can be used for positioning the conducting wire. That is to say, the conducting wire can be inserted into the wiring hole until the covering touches the step section. This makes it possible to control the amount of inserting the conducting wire independently of workers' different skills and always keeps the insertion position of the conducting wire constant.

Yet another door mirror set plate according to the present invention comprises: a synthetic resin base plate attached to a vehicle; a cylindrical support shaft which is vertically provided on the base plate integrally therewith and rotatively supports a door mirror body storing a mirror plate; a stopper which is vertically provided on the top surface of the base plate, engages with a guide groove provided for the door mirror body, and touches an end of the guide groove to restrict rotational angles of the door mirror body; and a positioning protrusion which is formed integrally with the stopper and engages with a positioning hole provided on the door mirror body when the door mirror body is moved to a specified position.

The door mirror set plate is configured to integrally form the stopper and the positioning protrusion both of which relate to rotative movements of the door mirror body. Accordingly, the positioning protrusion can supplement the strength of the stopper, making it possible to improve the durability. Since the stopper and the positioning protrusion are integrated, the part shape is simplified and the space saving efficiency improves.

On the door mirror set plate, it may be preferable to provide a slide-contact section at a portion corresponding to the same diameter as that of the positioning hole of the door mirror body in order to allow the positioning protrusion to run onto the slide-contact section in accordance with rotative movement of the door mirror.

Further, it may be preferable to configure the positioning protrusion to engage with the positioning hole when the door mirror body is moved to the neutral position. Furthermore, it may be preferable to configure the positioning protrusion such that it runs onto the slide-contact section when the door mirror body is set to anywhere other than a neutral position. Additionally, it may be preferable to configure the positioning protrusion such that when a force is supplied toward the slide-contact section, the positioning protrusion is pressed against the slide-contact section.

On the door mirror set plate, it may be preferable to form a slope at one end of the positioning protrusion and at one end of the slide-contact section, wherein both slopes face to each other when the door mirror body is set to a neutral position. In this case, when the door mirror body is moved to a retracted position, both of the slopes slidingly contact with each other to let the positioning protrusion run onto the slide-contact section.

Also, on the door mirror set plate, the other end of the positioning protrusion and the other end of the slide-contact section may be formed approximately at right angles, with both ends facing each other when the door mirror body is moved to a neutral position. In this case, when the door mirror body is moved to a safety position, the end surface of the positioning protrusion climbs the end surface of the slide-contact section to run onto the slide-contact section.

On the other hand, it may be preferable to form the door mirror set plate of glass fiber reinforced polyamide.

The above-described and other objects, and novel features of the present invention will become apparent more fully from the description of the following specification in conjunction with the accompanying drawings.

DESCRIPTION OF THE PREFERRED EMBODIMENT

Figure 1:
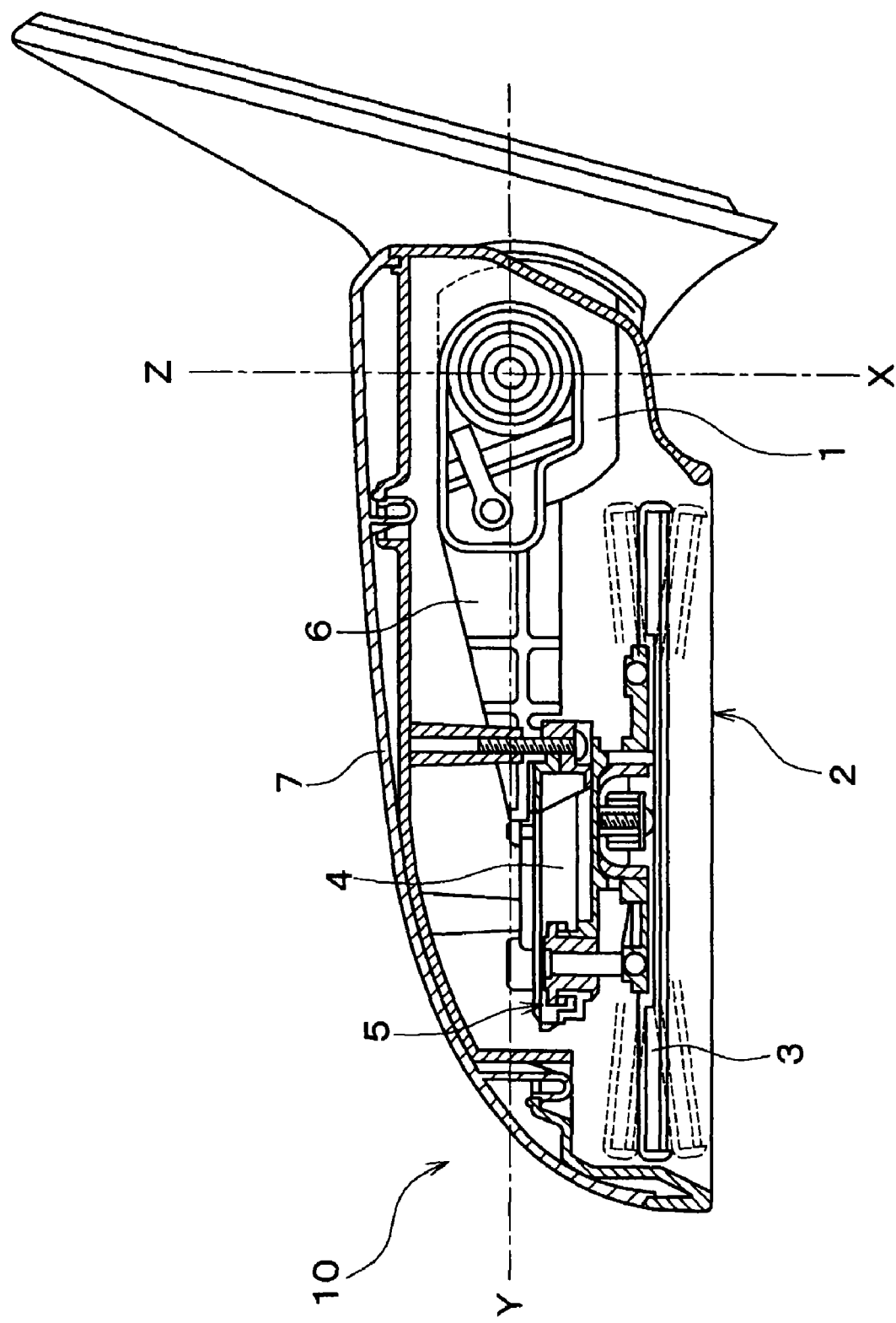
FIG. 1 is an explanatory diagram showing an internal configuration of a door mirror using the door mirror set plate according to an embodiment of the present invention, wherein the door mirror is viewed from the top.
Figure 2:
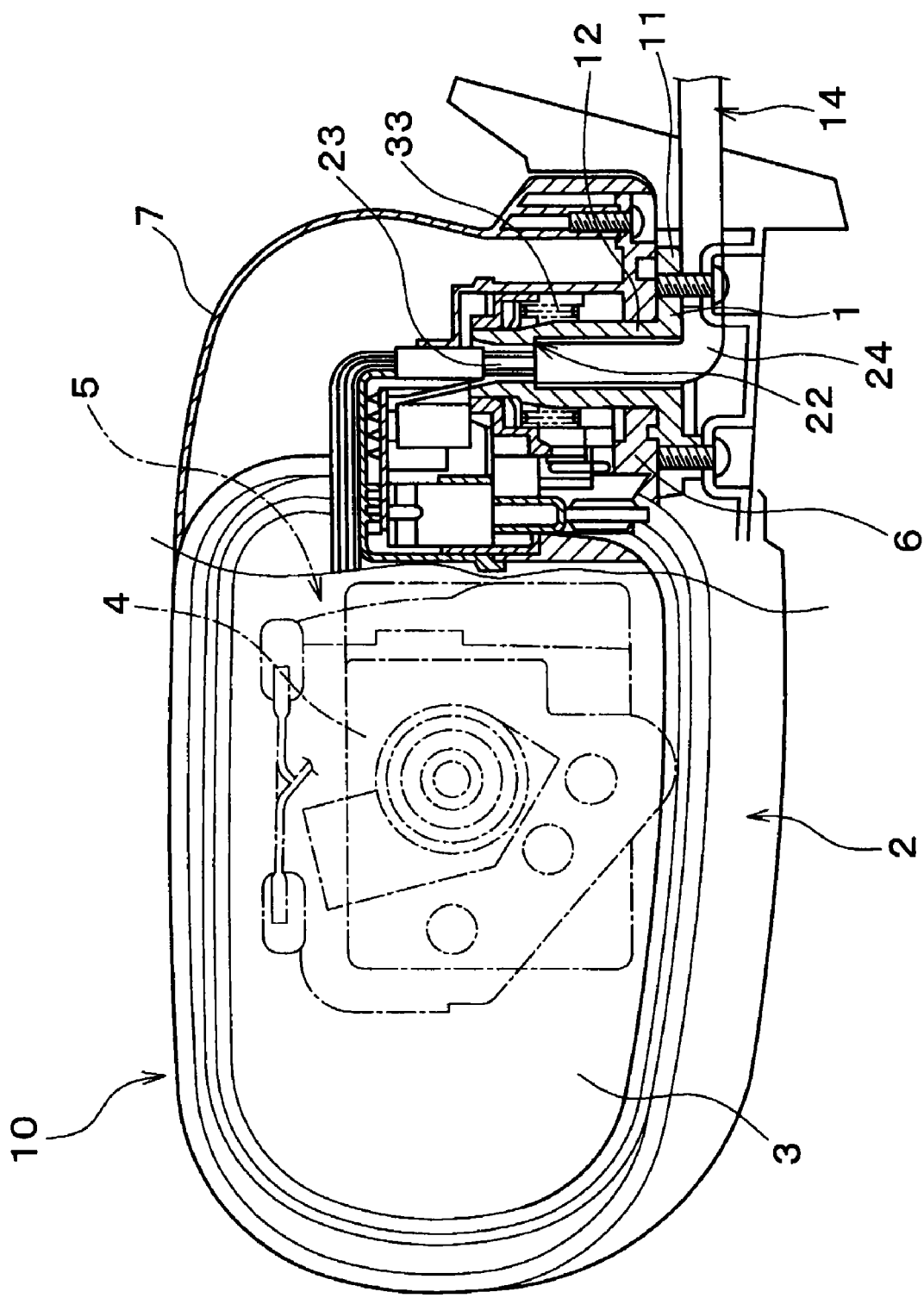
FIG. 2 is a front view of the door mirror in FIG. 1 partly in section.
Figure 3:
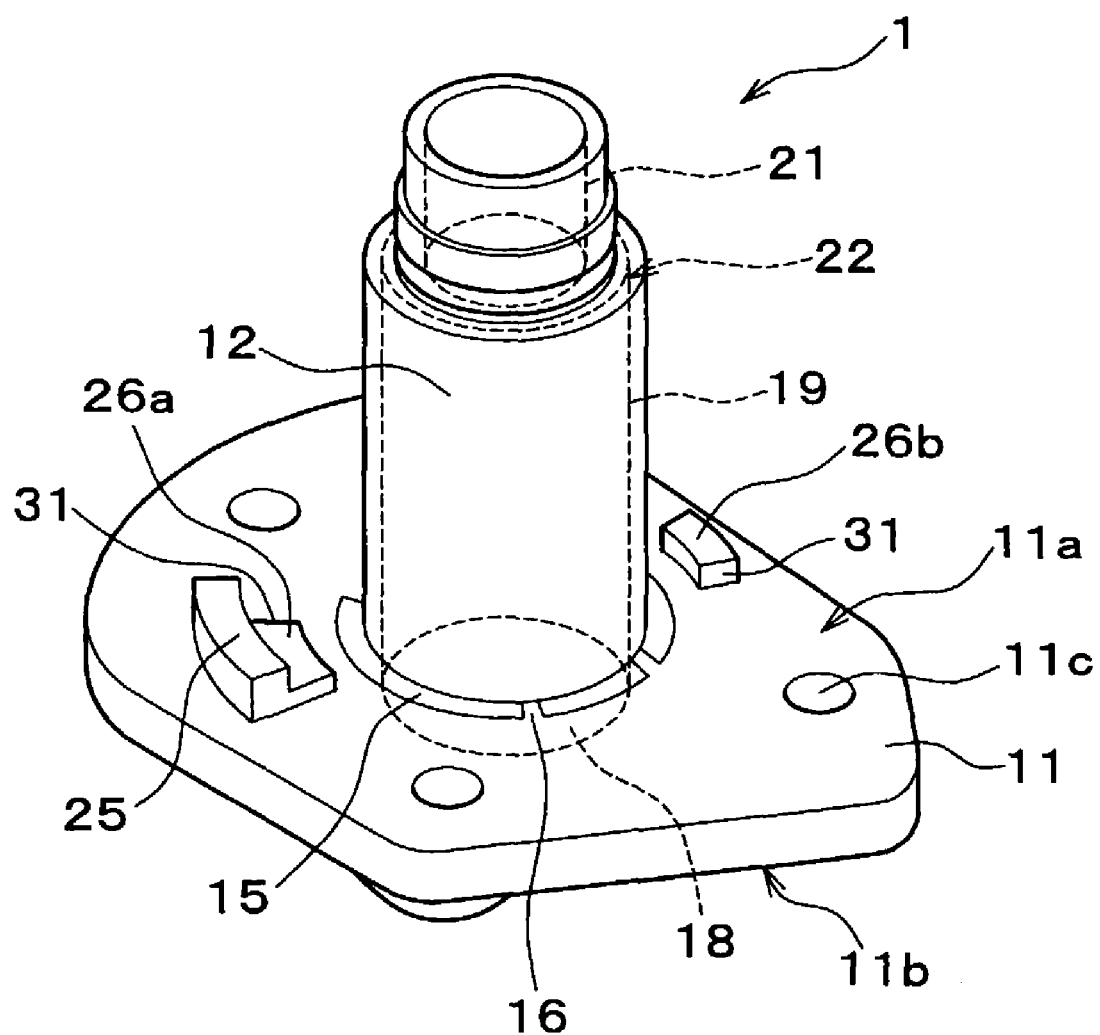
FIG. 3 is a perspective view showing a configuration of the door mirror set plate as the embodiment of the present invention.

An embodiment of the present invention will be described in further detail with reference to the accompanying drawings. As shown in FIG. 1, a door mirror 10 comprises a door mirror set plate 1 (hereafter abbreviated to a set plate 1) and a door mirror body 2. The set plate 1 is fixed to a body side of the car. The door mirror body 2 is rotatively attached onto the set plate 1. The door mirror body 2 further comprises a body 5 and a bracket 6. The body 5 contains a drive unit 4 comprising a mirror plate 3, a motor, and the like. The bracket 6 holds the body 5 and is rotatively attached to the set plate 1.

The door mirror 10 is a so-called electric retractable apparatus. The door mirror body 2 can rotatively move approximately 180 degrees from a retracted position X to a safety position Z via a neutral position Y around the set plate 1 by means of the drive unit 4. The drive unit 4 allows angles of the mirror plate 3 to be controlled remotely. The door mirror body 2 is externally provided with a cover 7 that is colored so as to match a body color.

Figure 4:
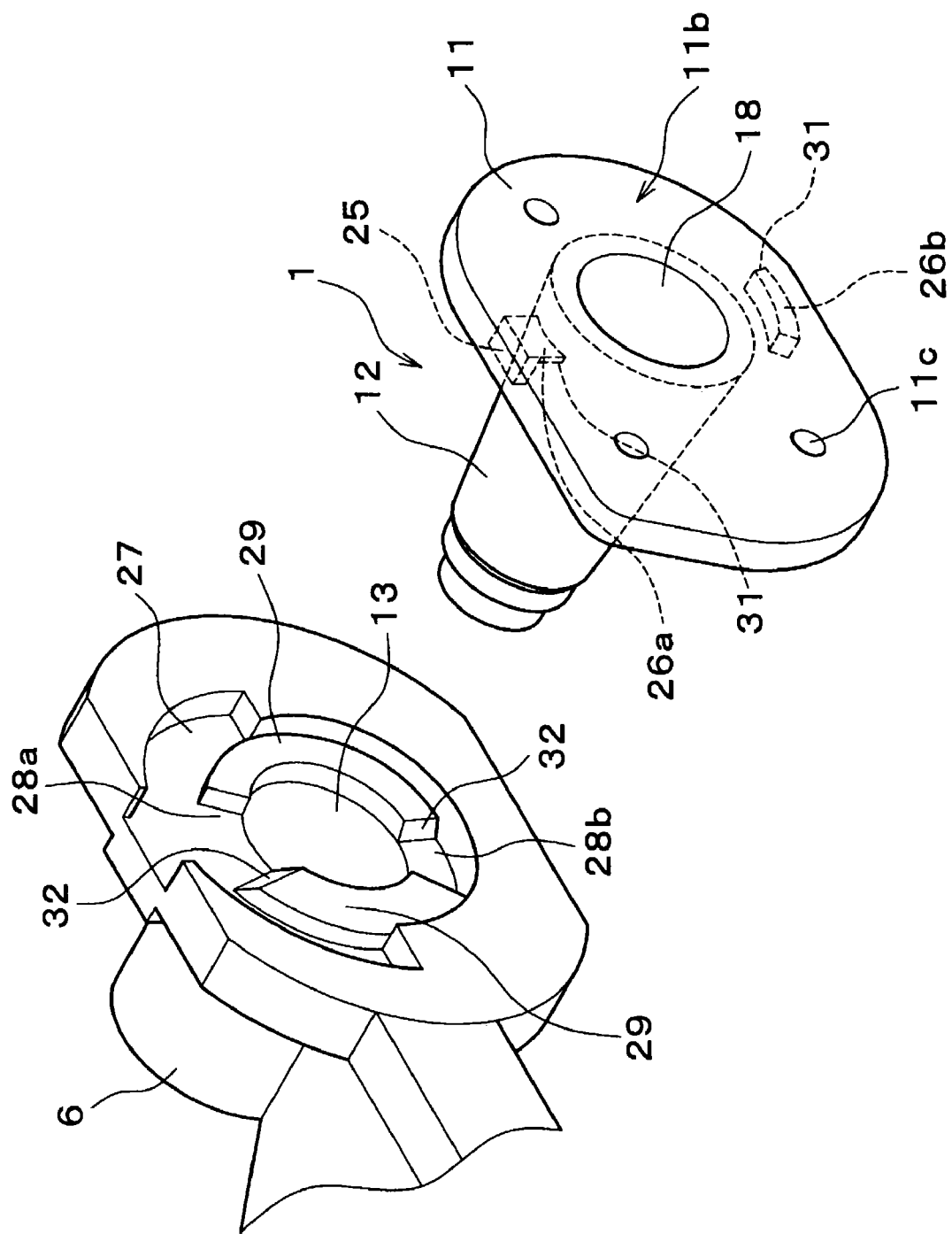
FIG. 4 is an explanatory diagram showing a configuration of a junction between the door mirror set plate and a door mirror body.
Figure 5:
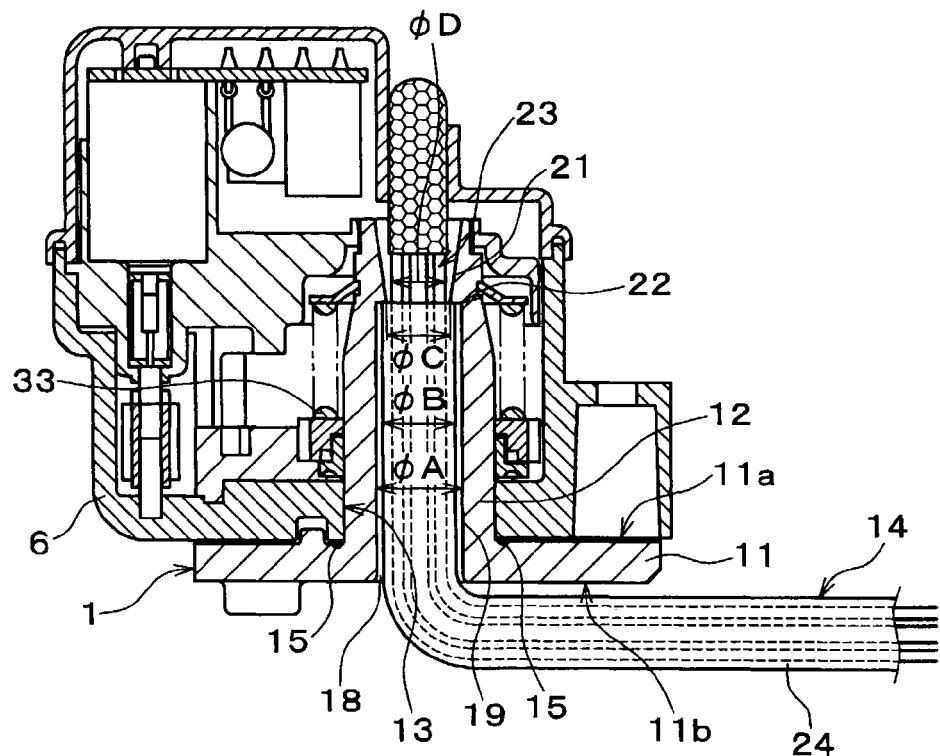
FIG. 5 is an explanatory diagram showing a state of joining the door mirror set plate and the door mirror body together.

The set plate 1 comprises a flat base plate 11 and a support shaft 12 vertically provided on the base plate 11. The base plate 11 and the support shaft 12 are integrally molded with synthetic resin such as glass fiber reinforced polyamide. A mounting hole 11c is formed in the base plate 11 for fixing it to a car door by means of a bolt (not shown). The support shaft 12 is attached with the bracket 6 as shown in FIGS. 4 and 5. The bracket 6 is provided with an engaging hole 13 into which the support shaft 12 is inserted. The inside of the support shaft 12 is formed as a hollow cylinder into which a conducting wire 14 is inserted for supplying power to the drive unit 4.

As shown in FIG. 5, there is provided a curved surface section 15 at the bottom of the support shaft 12 corresponding to its outside periphery on a top surface of the base plate 11a (hereafter abbreviated to a top surface 11a). The curved surface section 15 is embedded like a U-shaped groove around the support shaft 12 and curvedly connects an external surface of the support shaft 12 with the top surface 11a. The support shaft 12 supports the bracket 6 and is subject to loads at its bottom due to rotations or vibrations of the door mirror 10. If a sharp edge is formed between the support shaft 12 and the base plate 11, a stress concentrates thereon. Since the set plate 1 is provided with the curved surface section 15 at the bottom of the support shaft 12, the curved surface section 15 relieves the stress concentration on a junction between the support shaft 12 and the base plate 11 and helps to improve the durability.

Since the curved surface section 15 is provided like a groove below the top surface 11a, the curved surface section 15 does not appear above the top surface 11a. That is to say, a radius (R) of the curved surface section 15 has no effect on an external dimension of the support shaft 12 fitting into the engaging hole 13 on the set plate 1. Accordingly, it is possible to provide the curved surface section 15 for relieving the stress in a narrow space without increasing an external diameter of the support shaft 12. Further, an external diameter of the support shaft 12 can be the same as that for a conventional set plate. The support shaft 12 can be tightly joined to the conventional bracket 6 without changing the dimension of the engaging hole 13.

Figure 6:
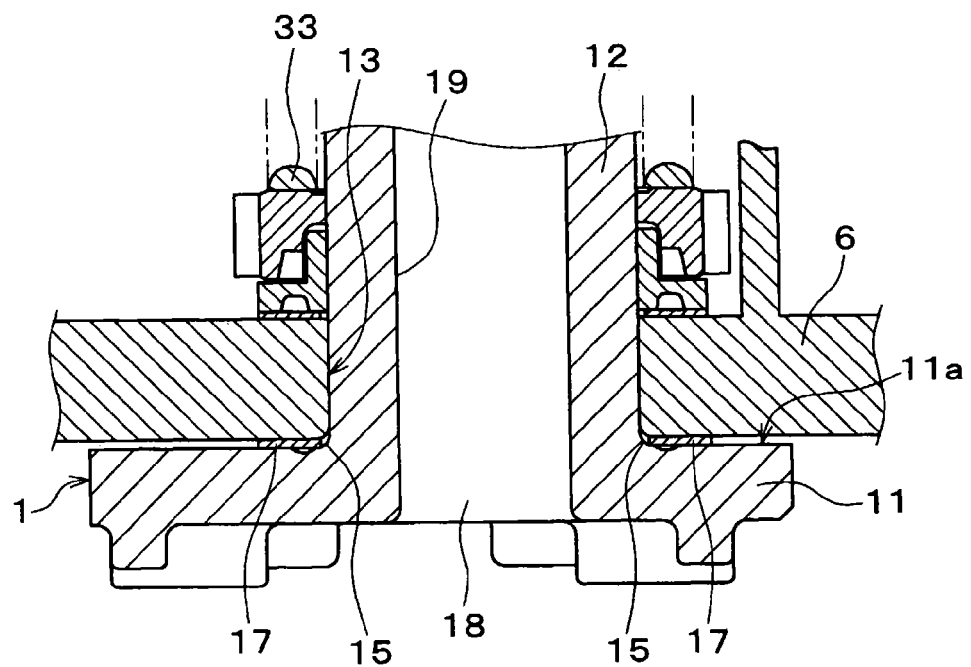
FIG. 6 is an enlarged sectional view of a support shaft base of the door mirror set plate in FIG. 5.
Figure 7:
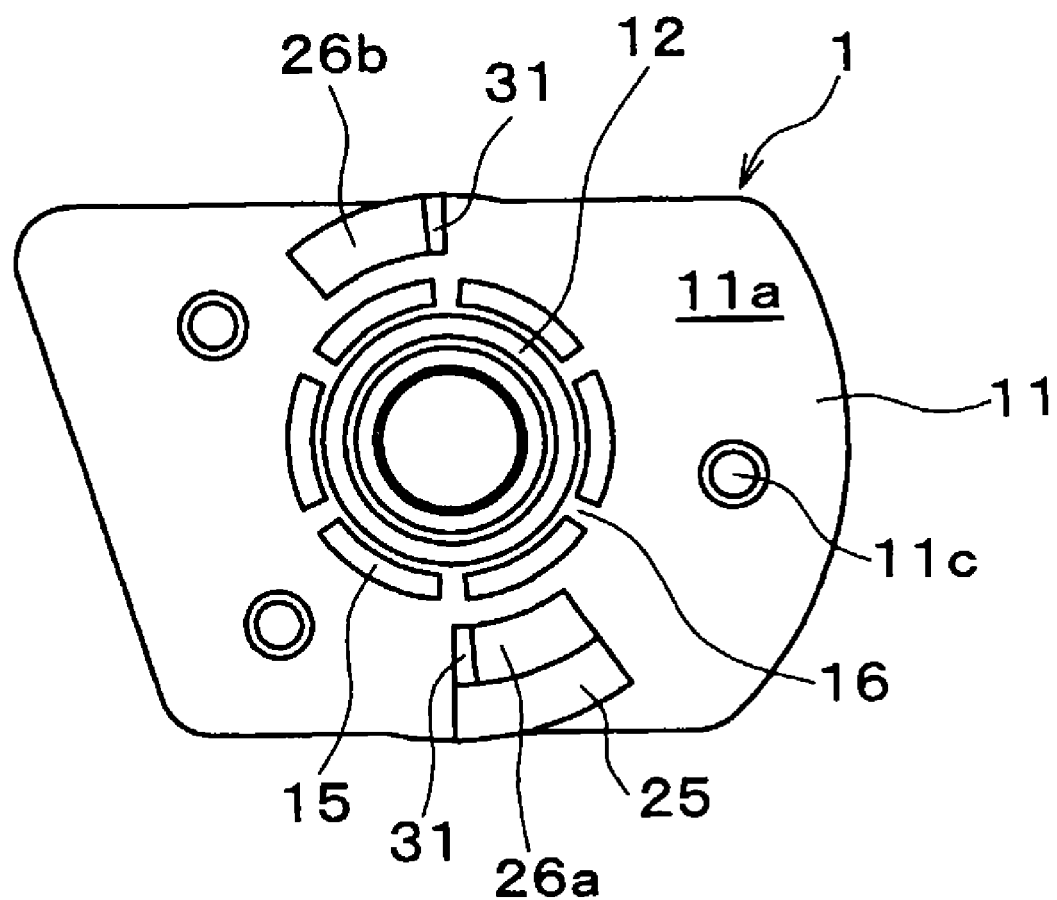
FIG. 7 is a plan view of the door mirror set plate.

A radial flat section 16 is formed at six positions equally on the groove-shaped curved surface section 15 so that each flat section 16 crosses the curved surface section 15. The flat section 16 is formed on the same level as the top surface 11a and connects between an external surface of the support shaft 12 and the top surface 11a. As shown in FIG. 6, there is provided a thrust washer 17 for supporting the bracket 6 at the bottom of the support shaft 12. The thrust washer 17 is inserted between the top surface 11a and a bottom surface of the bracket 6.

Since the curved surface section 15 is formed like a groove on the set plate 1, it is unnecessary to avoid the curved surface section 15 when arranging the thrust washer 17. An internal diameter of the thrust washer 17 can approximate to an external diameter of the support shaft 12 without being hindered by the curved surface section 15. Further, the flat section 16 is formed so as to bridge the groove of the curved surface section 15. Even if part of the thrust washer 17 covers the curved surface section 15, its bottom surface is supported by the flat section 16. If the internal diameter of the thrust washer 17 is decreased, it is possible to support the thrust washer 17 on the flat surface. Therefore, this ensures a smooth rotation of the door mirror 10. It is possible to provide a small play between the thrust washer 17 and the support shaft 12 and limit an external diameter of the washer. This is advantageous to space saving.

Inside the support shaft 12, there is formed a wiring hole 18 for inserting the conducting wire 14. The wiring hole 18 is provided with a large diameter section 19 at the bottom side and a small diameter section 21 at the tip side. A step section 22 is formed at a boundary between the large diameter section 19 and the small diameter section 21. The conducting wire 14 comprises a core wire section 23 formed of a plurality of coated copper wires and a water-proof and insulating vinyl tube (covering) 24 and is inserted into the wiring hole 18 from the side of the large diameter section 19. An internal diameter $\phi A$ of the large diameter section 19 is larger than an external diameter $\phi B$ of the vinyl tube 24. By contrast, an internal diameter $\phi C$ of the small diameter section 21 is smaller than the external diameter $\phi B$ of the vinyl tube 24 and is larger than an external diameter $\phi D$ of the core wire section 23 ($\phi A > \phi B$, $\phi B > \phi C > \phi D$).

When the conducting wire 14 is inserted into the wiring hole 18, the tip of the vinyl tube 24 touches the step section 22, i.e., the boundary between the large diameter section 19 and the small diameter section 21. The set plate 1 uses the step section 22 for positioning the conducting wire 14. The conducting wire 14 is inserted into the wiring hole 18 until the vinyl tube 24 touches the step section 22. This makes it possible to control the amount of inserting the conducting wire 14 independently of workers' different skills and always keeps the insertion position of the conducting wire 14 constant.

A bottom surface of the base plate 11b (hereafter abbreviated to a bottom surface 11b) is protuberantly provided with a stopper 25 and positioning protrusions 26a and 26b. The stopper 25 restricts rotational angles of the door mirror body 2. The positioning protrusions 26a and 26b are used to hold the door mirror body 2 at the neutral position Y. The positioning protrusion 26a is formed integrally with the stopper 25. As shown in FIG. 4, a guide groove 27 and positioning holes 28a and 28b are formed in the bottom surface side of the bracket 6 around the engaging hole 13. The stopper 25 engages with the guide groove 27. The positioning protrusions 26a and 26b engage with the positioning holes 28a and 28b.

When the door mirror body 2 rotates, the stopper 25 moves in the guide groove 27. The stopper 25 touches the end of the guide groove 27 to restrict the rotation of the door mirror body 2. The guide groove 27 is formed at approximately 180 degrees around the engaging hole 13 and restricts rotational angles of the door mirror body 2 to approximately 180 degrees. When the door mirror body 2 is folded to the retracted position X in FIG. 1, the stopper 25 touches the left end of the guide groove 27 in FIG. 4. When the door mirror body 2 is moved to the neutral position Y in FIG. 1, the stopper 25 is positioned slightly to the right of the center of the guide groove 27. When the door mirror body 2 is moved to the side opposite the retracted position X, the stopper 25 moves to the right of the guide groove 27 in FIG. 4. The door mirror body 2 is allowed to rotatively move until it touches the right end. When the stopper 25 touches the right end of the guide groove 27, the position of the door mirror body 2 corresponds to the safety position Z in FIG. 1.

The positioning protrusions 26a and 26b are provided symmetrically with reference to the support shaft 12. When the door mirror body 2 moves to the position Y, the positioning protrusions 26a and 26b engage with the positioning holes 28a and 28b. When the door mirror body 2 is positioned anywhere except the position Y, the positioning protrusions 26a and 26b run onto a slide-contact section 29 formed between the positioning holes 28a and 28b. After the bracket 6 is mounted on the set plate 1, the bracket 6 is pressed toward the set plate 1 by means of a spring 33 as shown in FIG. 5. The positioning protrusions 26a and 26b run onto the slide-contact section 29 against this pressure and are pushed into the positioning holes 28a and 28b by means of this pressure.

A slope 31 is formed on one end of each of the positioning protrusions 26a and 26b. A slope 32 is formed on one end of the slide-contact section 29. When the positioning protrusions 26a and 26b engage with the positioning holes 28a and 28b, both slopes 31 and 32 face to each other and keep in contact with each other. When the door mirror body 2 is folded to the position X, the positioning protrusions 26a and 26b run onto the slide-contact section 29 by sliding on both slopes 31 and 32. Although the pressure from the spring 33 causes a resistance force, the door mirror body 2 can be relatively smoothly folded to the retracted position X.

When the door mirror body 2 is folded to the safety position Z, however, the positioning protrusions 26a and 26b must run onto the slide-contact section 29 from its vertical end surface. The vertical end surface of the slide-contact section 29 faces to the vertical end surface of each of the positioning protrusions 26a and 26b. In this case, it is necessary to apply a force to let one of both vertical end surfaces run onto the other in addition to the pressure of the spring 33. Accordingly, unlike the retracted position X, the door mirror body 2 is configured not to easily rotate to the position Z. If a human being or an object impacts on the door mirror body 2 to apply a large force, however, the positioning protrusions 26a and 26b run onto the slide-contact section 29 to rotatively move the door mirror body 2 to the position Z, damping a damage due to the impact.

In this manner, the set plate 1 is configured to integrally form the stopper 25 and the positioning protrusion 26a both of which relate to rotative movements of the door mirror body. Accordingly, the positioning protrusion 26a can supplement the strength of the stopper 25, making it possible to improve the durability. Since the stopper 25 and the positioning protrusion 26a are integrated, the part shape is simplified and the space saving efficiency improves. If steel balls slidingly touch a synthetic resin base plate as practiced on a conventional set plate, the base plate is hollowed to degrade the positioning effect by a dent. Since the set plate 1 uses the synthetic resin positioning protrusions 26a and 26b for positioning the door mirror body 2 instead of steel balls, however, there are no problems of wear due to the steel balls or a degraded positioning effect.

Detailed description has hereinabove been given of the invention achieved by the present inventor with reference to the embodiment. However, the present invention should not be limited to the embodiment described above, and may be variously modified within the scope not departing from the gist of the invention.

While the above-mentioned embodiment has presented an example of using the set plate according to the present invention for the electric retractable door mirror, it is also possible to use the set plate according to the present invention for a manually retractable door mirror. While the positioning protrusions 26a and 26b are used to determine the neutral position Y, it may be preferable to determine the retracted position X and the safety position Z. In this case, additional positioning holes 28a and 28b are properly formed for the corresponding positions. The set plate material is not limited to the glass fiber reinforced polyamide. It is also possible to use the other types of synthetic resins such as polyacetal.

What is claimed is:

1. A door mirror set plate comprising:
   a synthetic resin base plate attached to a vehicle;
   a cylindrical support shaft which is vertically provided on the base plate integrally therewith and rotatively supports a door mirror body storing a mirror plate; and
   a curved surface section which is embedded around a base of the support shaft on the base plate;
   wherein the curved surface section curvedly connects an external surface of the support shaft with a top surface of the base plate,
   wherein the curved surface section is disposed below the top surface of the base plate, and
   wherein there is provided a flat section for supporting a thrust washer which is formed at an outside periphery of the support shaft base on the top surface of the base plate at the same level as the top surface of the base plate and which connects between the external surface of the support shaft and the top surface of the base plate by crossing the curved surface section.

2. The door mirror set plate according to claim 1, wherein the flat section is formed radially on an outside periphery of the support shaft base.

* * * * *